United States Patent
Zhao

(10) Patent No.: US 12,033,068 B2
(45) Date of Patent: Jul. 9, 2024

(54) METHOD AND DEVICE FOR CASH ADVANCE RECOGNITION

(71) Applicant: ADVANCED NEW TECHNOLOGIES CO., LTD., Grand Cayman (KY)

(72) Inventor: Qi Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 1421 days.

(21) Appl. No.: 16/446,304

(22) Filed: Jun. 19, 2019

(65) Prior Publication Data

US 2019/0392314 A1  Dec. 26, 2019

(30) Foreign Application Priority Data

Jun. 22, 2018  (CN) .......................... 201810651125.9

(51) Int. Cl.
*G06N 3/08* (2023.01)
*G06N 3/02* (2006.01)
(Continued)

(52) U.S. Cl.
CPC ................ *G06N 3/08* (2013.01); *G06N 3/045* (2023.01); *G06Q 20/4016* (2013.01); *G06Q 20/407* (2013.01); *G06N 3/02* (2013.01)

(58) Field of Classification Search
CPC ............ G06N 3/08; G06N 3/045; G06N 3/02; G06Q 20/4016; G06Q 20/3223
See application file for complete search history.

(56) References Cited

U.S. PATENT DOCUMENTS

| 9,324,022 B2 | 4/2016 | Williams, Jr. et al. |
| 9,679,258 B2 | 6/2017 | Mnih et al. |

(Continued)

FOREIGN PATENT DOCUMENTS

| CN | 102567781 A | 7/2012 |
| CN | 101355504 B | 8/2012 |

(Continued)

OTHER PUBLICATIONS

Vieira, A., Ribeiro, B., Vieira, A., & Ribeiro, B. (2018). Reinforcement Learning and Robotics. Introduction to Deep Learning Business Applications for Developers: From Conversational Bots in Customer Service to Medical Image Processing, 137-168. (Year: 2018).*

(Continued)

*Primary Examiner* — Oluwatosin Alabi

(57) ABSTRACT

Embodiments of the application provide a method and device for training a cash-return recognition model and a method and device for cash-return recognition, the training method comprises: acquiring first transaction information of a first transaction and a first cash-return label value of the first transaction; calculating a first cash-return predictive value for the first transaction, and a Q-value's label value corresponding to the first transaction information and the first cash-return predictive value; and training a Deep Q-Network (DQN) by adjusting parameters of the DQN such that an absolute value of a difference between a first Q-value's predictive value output by the trained DQN and the Q-value's label value is smaller than that between the first Q-value's predictive value output by the untrained DQN and the Q-value's label value, the first Q-value's predictive value obtained by inputting the first transaction information and the first cash-return predictive value to the DQN.

20 Claims, 4 Drawing Sheets

(51) Int. Cl.
*G06N 3/045* (2023.01)
*G06Q 20/40* (2012.01)

(56) References Cited

U.S. PATENT DOCUMENTS

| | | | |
|---|---|---|---|
| 10,007,915 | B2 | 6/2018 | Singh et al. |
| 10,417,556 | B1 | 9/2019 | Fairbank et al. |
| 2015/0100530 | A1 | 4/2015 | Mnih et al. |
| 2016/0140567 | A1 | 5/2016 | Hanna et al. |
| 2017/0200164 | A1 | 7/2017 | Choi et al. |
| 2017/0278018 | A1 | 9/2017 | Mnih et al. |
| 2018/0276541 | A1 | 9/2018 | Studnitzer et al. |
| 2019/0095992 | A1 | 3/2019 | Soh |
| 2019/0122111 | A1 | 4/2019 | Min et al. |
| 2019/0156198 | A1 | 5/2019 | Mars et al. |
| 2019/0188141 | A1 | 6/2019 | Ma et al. |
| 2019/0190538 | A1* | 6/2019 | Park .................. H03M 7/30 |
| 2019/0205643 | A1* | 7/2019 | Liu .................. G06N 3/045 |
| 2019/0279042 | A1 | 9/2019 | Cataltepe et al. |
| 2019/0303765 | A1* | 10/2019 | Gou .................. G06V 10/82 |
| 2019/0377819 | A1 | 12/2019 | Filliben et al. |

FOREIGN PATENT DOCUMENTS

| | | |
|---|---|---|
| CN | 105637540 A | 6/2016 |
| CN | 107341436 A | 11/2017 |
| CN | 107358293 A | 11/2017 |
| CN | 107563885 A | 1/2018 |
| CN | 108734220 A | 11/2018 |
| CN | 109690578 A | 4/2019 |
| EP | 3221835 A1 | 9/2017 |
| EP | 3543917 A1 | 9/2019 |
| JP | 2019164793 A | 9/2019 |
| WO | 2018227800 A1 | 12/2018 |
| WO | 2019016106 A1 | 1/2019 |
| WO | 2019103738 A1 | 5/2019 |
| WO | 2019118644 A1 | 6/2019 |
| WO | 2019164496 A1 | 8/2019 |
| WO | 2019172956 A1 | 9/2019 |

OTHER PUBLICATIONS

Alimoradi MR, Kashan AH. A league championship algorithm equipped with network structure and backward Q-learning for extrating stock trading rules. Applied soft computing. Jul. 1, 2018;68:478-93. (Year: 2018).*

Written Opinion and International Search Report for PCT Application No. PCT/US2019/038024 dated Oct. 7, 2019 (13 pages).

Mnih et al., "Human-level control through deep reinforcement learning", NATURE, vol. 518, No. 7540, Feb. 25, 2015 (14 pages).

First Search for Chinese Application No. 201810651125 dated Apr. 7, 2020 (2 pages).

First Office Action for Chinese Application No. 201810651125 dated Apr. 15, 2020.

Search Report for Taiwanese Application No. 108110466 dated Apr. 16, 2020.

* cited by examiner

METHOD AND DEVICE FOR CASH ADVANCE RECOGNITION

CROSS-REFERENCE TO RELATED APPLICATIONS

The present application is based on and claims priority to the Chinese Patent Application No. 201810651125.9, filed on Jun. 22, 2018 and entitled "METHOD AND DEVICE FOR CASH ADVANCE RECOGNITION," which is incorporated herein by reference in its entirety.

TECHNICAL FIELD

Embodiments of the application relate to the technical field of machine learning, and more particularly, to a method and device for training a cash return fraud recognition model, and a method and device for cash return fraud recognition.

BACKGROUND

A large number of consumer credit products have been emerging in the consumer finance market; functions of the products have been continuously improved; more and more consumers have been admitted to use such products; and credit limits for the products have been continuously increased. As a result, using these consumer credit products to pay on-line and off-line transactions has become increasingly popular and represented a trend in payment methods. Huabei (also referred to as "Ant Credit Pay" or "Ant Check Later"), as one of the consumer credit products, provides superior user experiences for its huge user base, has a powerful capability of accommodating various payment scenarios, and thus is becoming a mainstream consumer credit payment instrument. By virtue of its attribute of "transaction first and payment later," Ant Credit Pay helps its users effectively alleviate short-term financial pressure and accumulate a good personal credit history. In addition, payments by cell phones have improved efficiency and safety, avoiding inefficient and complicated processes of cash payments.

However, cash return fraud poses a great threat to such a virtuous payment circle. Not only do malicious or fraudulent cash returns harm a buyer's credit history, but also service charges often lower a buyer's willingness to make repayment. Disbursement data also has shown that users who perform malicious cash returns have a rate of poor disbursement and a rate of overdue up to several or tens of times those of normal users. Accordingly, as an important constituent of risk control strategies of Ant Credit Pay, an anti-cash-return strategy plays a significant role in the sound and benign development of Ant Credit Pay products, as well as in the development of the entire consumer credit market.

Current approaches for recognizing cash-return transactions (such as malicious or fraudulent cash-return transactions) include supervised learning, semi-supervised learning, unsupervised learning, etc. A more efficient solution for recognition of cash-return transactions is needed.

SUMMARY

The specification provides a more efficient solution for recognition of cash-return transactions to address drawbacks of existing technologies.

To achieve the above objectives, one aspect of the specification provides a method for training a cash-return recognition model, the cash-return recognition model including a first DQN and a second DQN, the method comprising: acquiring first transaction information of a first transaction and a first cash-return label value of the first transaction, the first cash-return label value indicating whether the first transaction is labeled as a cash-return transaction; calculating a first cash-return predictive value for the first transaction by inputting the first transaction information to the first DQN, the first cash-return predictive value indicating whether the first transaction is predicted to be a cash-return transaction; calculating a Q-value's label value corresponding to the first transaction information and the first cash-return predictive value by using a Q learning algorithm based on the first DQN and the first cash-return label value; and training the second DQN based on the first transaction information, the first cash-return predictive value, and the Q-value's label value by adjusting parameters of the second DQN such that an absolute value of a difference between a first Q-value's predictive value output by the trained second DQN and the Q-value's label value is smaller than that between the first Q-value's predictive value output by the untrained second DQN and the Q-value's label value, wherein the first Q-value's predictive value is output by inputting the first transaction information and the first cash-return predictive value to the second DQN, and the first Q-value's predictive value corresponds to the first transaction information and the first cash-return predictive value.

In some embodiments, calculating a first cash-return predictive value for the first transaction comprises: inputting the first transaction information to the first DQN to obtain a two-dimensional vector of Q-value's predictive values; and calculating the first cash-return predictive value according to a ε-greedy policy based on the vector.

In other embodiments, the first transaction information comprises a transaction amount, and wherein calculating a Q-value's label value corresponding to the first transaction information and the first cash-return predictive value by using a Q learning algorithm comprises: acquiring second transaction information of a second transaction and a second cash-return label value of the second transaction, the second cash-return label value indicating whether the second transaction is labeled as a cash-return transaction; determining a return value for the first transaction based on the first cash-return predictive value, the first cash-return label value, and the transaction amount; inputting the second transaction information to the first DQN to obtain a second Q-value's predictive value corresponding to the second transaction information and the second cash-return label value; and calculating the Q-value's label value corresponding to the first transaction information and the first cash-return predictive value based on the return value and the second Q-value's predictive value.

In still other embodiments, inputting the second transaction information to the first DQN to obtain the second Q-value's predictive value corresponding to the second transaction information and the second cash-return label value comprises: inputting the second transaction information to the first DQN to obtain a two-dimensional vector of Q-value's predictive values corresponding to the second transaction information; performing one-hot encoding on the second cash-return label value to obtain a two-dimensional vector corresponding to the second cash-return label value; performing an element-wise multiplication on the vector of Q-value's predictive values and the vector corresponding to the second cash-return label value to obtain a two-dimensional joint characterization vector; and selecting a non-zero value in the joint characterization vector as the second Q-value's predictive value.

In yet other embodiments, determining the return value for the first transaction based on the first cash-return predictive value, the first cash-return label value, and the transaction amount comprises: in response to that the first cash-return predictive value is consistent with the first cash-return label value, determining the return value for the first transaction to be the transaction amount; and in response to that the first cash-return predictive value is inconsistent with the first cash-return label value, determining the return value for the first transaction to be the negative of the transaction amount.

In some embodiments, the method further comprises adding the return value for the first transaction to a total return value of the model after determining the return value.

In other embodiments, the cash-return recognition model further comprises a sample queue including a number of samples in sequence, the method further comprises: updating the sample queue by deleting a predetermined number of existing samples ranked in the front from the sample queue when receiving a predetermined number of new samples.

In still other embodiments, the method further comprises: preparing the samples in the sample queue, each sample including a transaction's information, a cash-return predictive value of the transaction, and a Q-value's label value corresponding to the transaction's information and the cash-return predictive value.

In yet other embodiments, the first transaction information comprises attribute information, a buyer's information, a seller's information, and logistics information of the first transaction.

In some embodiments, the first DQN or the second DQN comprises one of the following neural networks: an Long Short-Term Memory (LSTM) network, a Deep Neural Network (DNN), a Convolutional Neural Network (CNN), and an Recurrent Neural Network (RNN).

In other embodiments, training the second DQN based on the first transaction information, the first cash-return predictive value, and the Q-value's label value comprises training the second DQN by a stochastic gradient descent algorithm.

In still other embodiments, the method further comprises setting parameters of the first DQN based on the parameters of the second DQN. In yet other embodiments, the first DQN and the second DQN are interchangeable.

Another aspect of the specification provides a method for cash-return recognition, the method comprising: acquiring transaction information of a transaction; and inputting the transaction information to a trained cash-return recognition model to obtain a cash-return predictive value for the transaction, the cash-return predictive value indicating whether the transaction is predicted to be a cash-return transaction.

In some embodiments, inputting the transaction information to the trained cash-return recognition model to obtain the cash-return predictive value for the transaction comprises: inputting the transaction information to the trained cash-return recognition model to obtain a two-dimensional vector of Q-value's predictive values corresponding to the transaction information; and calculating the cash-return predictive value for the transaction according to a ε-greedy policy based on the vector.

Still another aspect of the specification provides a device for training a cash-return recognition model, the cash-return recognition model comprising a first DQN and a second DQN, the device comprising: one or more processors and one or more non-transitory computer-readable memories coupled to the one or more processors and configured with instructions executable by the one or more processors to cause the system to perform operations comprising: acquiring first transaction information of a first transaction and a first cash-return label value of the first transaction, the first cash-return label value indicating whether the first transaction is labeled as a cash-return transaction; calculating a first cash-return predictive value for the first transaction by inputting the first transaction information to the first DQN, the first cash-return predictive value indicating whether the first transaction is predicted to be a cash-return transaction; calculating a Q-value's label value corresponding to the first transaction information and the first cash-return predictive value by using a Q learning algorithm based on the first DQN and the first cash-return label value; and training the second DQN based on the first transaction information, the first cash-return predictive value, and the Q-value's label value by adjusting parameters of the second DQN such that an absolute value of a difference between a first Q-value's predictive value output by the trained second DQN and the Q-value's label value is smaller than that between the first Q-value's predictive value output by the untrained second DQN and the Q-value's label value, wherein the first Q-value's predictive value is output by inputting the first transaction information and the first cash-return predictive value to the second DQN, and the first Q-value's predictive value corresponds to the first transaction information and the first cash-return predictive value.

According to the embodiments of the specification, by using a transaction amount as a return of a reinforcement learning model, and incorporating the amount into a learning process, the model can obtain a higher positive return when correctly recognizing a cash-return transaction involving a large amount, and result in a negative return in a misjudgment. Therefore, the model is more cautious about processing of transactions which involve large amounts, and thus fits business needs better. A deep neural network is used as an approximation function of a value function, and the neural network is trained based on inputs in small batches, helping reduce time and resource overheads of iterations and accelerate convergence of the model in training. Training mechanisms, such as experience replay, random sampling, and batch data, achieve the effect of sampling based on time windows. In the meanwhile, the random sampling ensures relative randomness of samples timewise.

BRIEF DESCRIPTION OF THE DRAWINGS

Embodiments of the specification can be made clearer through description with reference to the accompanying drawings.

DETAILED DESCRIPTION OF THE INVENTION

Embodiments of the specification will be described below with reference to the accompanying drawings.

Figure 1:
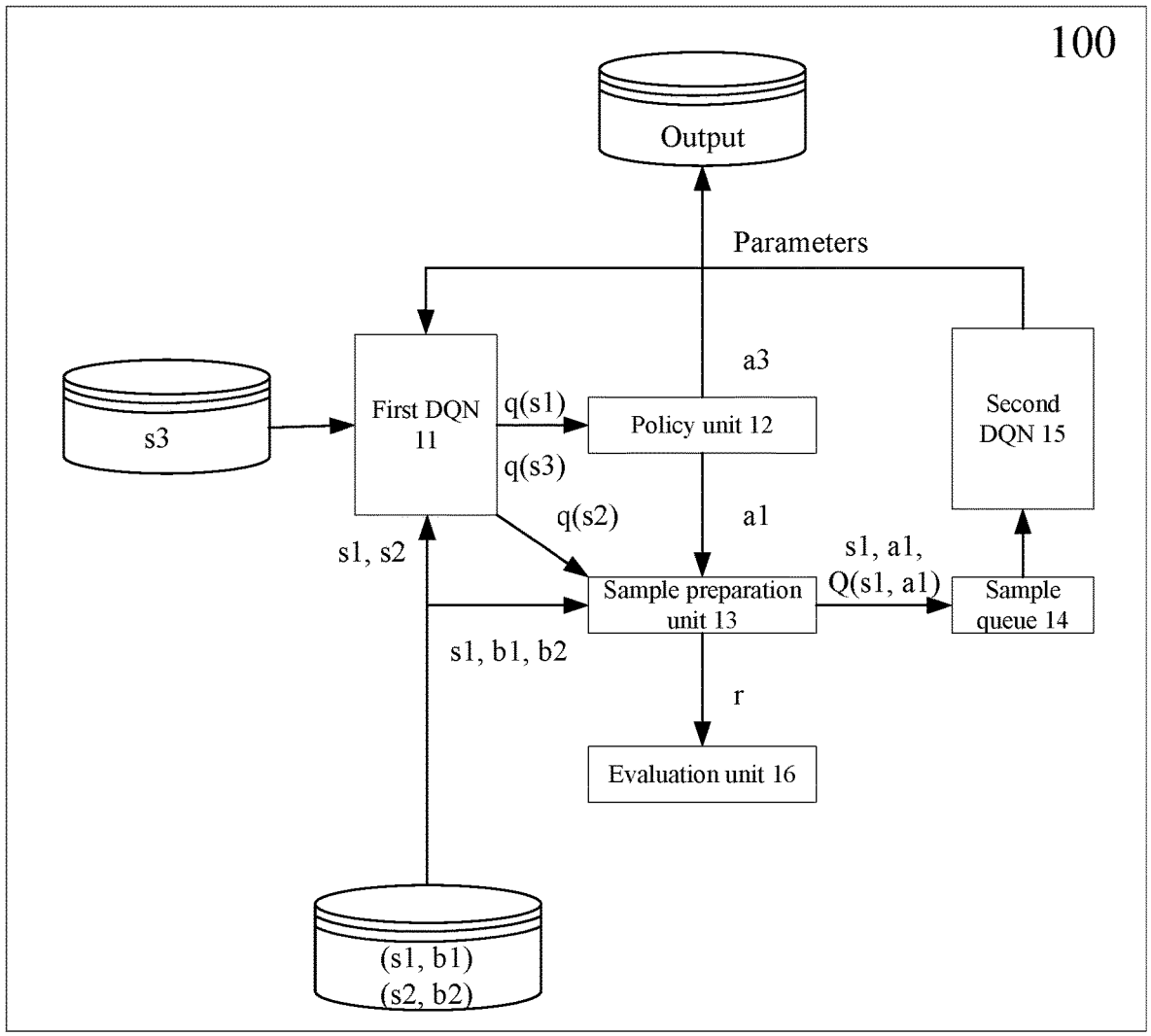
FIG. 1 is a schematic diagram illustrating a system for cash-return recognition according to some embodiments of the specification.

FIG. 1 is a schematic diagram illustrating a system 100 for cash-return recognition according to some embodiments of the specification. As shown in FIG. 1, the system 100 includes a first Deep Q-Network (DQN) 11, a policy unit 12, a sample preparation unit 13, a sample queue 14, a second DQN 15, and an evaluation unit 16. The first DQN 11 may be configured to recognize a cash-return transaction, and the second DQN 15 may be configured for model training. In a DQN, such as the first DQN 11 and the second DQN 15, a neural network may be used to non-linearly approximate a value function, such as a Q-value function (also referred to as a Q-function). A value of the Q-function is referred to as a Q-value. The neural network used in the DQN may be one of the following: an Long Short-Term Memory (LSTM) network, a Deep Neural Network (DNN), a Convolutional Neural Network (CNN), and an Recurrent Neural Network (RNN). In the specification, the LSTM network may be used in the DQN, such as the first DQN 11 and the second DQN 15, as an example. The DQN may output a two-dimensional Q-value vector according to an input feature vector of transaction information in a transaction, the two Q-values in the Q-value vector correspond to two actions respectively, i.e., the transaction being a cash-return transaction and the transaction being a non-cash-return transaction.

"Cash return" refers to using a transaction or transaction related action to obtain cash or other benefits. For example, a buyer purchases a product with a credit card or the Ant Credit Pay and then returns the purchased product for a cash refund. The buyer can thus obtain cash through the purchase and the return. In some situations, the purchase transaction may be a virtual or fake transaction and the buyer may default on the credit provided by the credit card company or Ant Credit Pay. For another example, a buyer and a merchant may perform fake transactions to get bonus points from payment platforms or credit card companies. A person of ordinary skill in the art may appreciate that there may be other types of cash-return transactions. Some of the cash return behaviors are illegal or malicious.

The system 100 for cash-return recognition according to the embodiments of the specification may be configured to recognize cash-return transactions involved in a consumer credit product of Ant Credit Pay. In transactions based on Ant Credit Pay, payment may be made by, for example, near field communication (NFC), WIFI, Quick Response (QR) code scanning technology, bar code scanning technology, Bluetooth, infrared, short message service (SMS), multimedia message service (MMS), etc.

During model training, a sample for the model training may be prepared as follows. Firstly, information s1 and a cash-return label value b1 of a first transaction are randomly acquired from a batch of transaction data concerning payment by Ant Credit Pay. Similarly, information s2 and a cash-return label value b2 of a second transaction are randomly acquired from the batch of transaction data. The cash-return label values b1 and b2 indicate whether the first and second transaction are a cash-return transaction respectively. The information s1 and s2 correspond to states in the DQN (such as the first DQN 11 or the second DQN 15), and the cash-return label values b1 and b2 correspond to label values of actions in the DQN. The batch of transaction data may include data of hundreds or thousands of transactions. For example, hundreds or thousands of samples may be prepared. In some embodiments, the information s1 and s2 are input to the first DQN 11 in sequence to output corresponding two-dimensional Q-value vectors q(s1) and q(s2) respectively. Subsequently, the Q-value vector q(s1) for the first transaction is sent to the policy unit 12, and the Q-value vector q(s2) for the second transaction is sent to the sample preparation unit 13. The policy unit 12 acquires a cash-return predictive value a1 for the first transaction from the Q-value vector q(s1) according to a predetermined policy (e.g., a greedy policy, a $\varepsilon$-greedy policy, etc.), and transfers the cash-return predictive value a1 to the sample preparation unit 13.

In some embodiments, the sample preparation unit 13 may obtain a Q-value's predictive value q(s2, b2) from the Q-value vector q(s2) for the second transaction based on the cash-return label value b2 of the second transaction, and use the Q-value's predictive value q(s2, b2) as the maximum of the Q-values contained in the Q-value vector q(s2). The sample preparation unit 13 may compare the cash-return predictive value a1 for the first transaction to the cash-return label value b1 to determine a return r. For example, when a1 is consistent with b1, r is determined to be a transaction amount included in the transaction information s1, and when a1 is inconsistent with b1, r is determined to be the negative of the transaction amount included in the transaction information s1. In some embodiments, the sample preparation unit 13 may calculate a Q-value's label value Q(s1, a1) for the first transaction based on the calculated r and q(s2, b2) according to a Q learning algorithm, send a1, Q(s1, a1), and s1 to the sample queue 14 as one sample, and send the return r to the evaluation unit 16. In the DQN (such as the first DQN 11 and the second DQN 15), a Q-value corresponding to a pair of a state (transaction information) and an action (a cash-return predictive value or a cash-return label value) represents an accumulated return of the system after the action is performed. The Q learning algorithm is to determine an optimal action-selection policy such that the policy maximizes the expected value of a reward over a number of steps. The Q-value represents the value of the reward. The Q learning algorithm will be described in detail with reference to FIG. 3.

In some embodiments, the sample queue 14 has a fixed length. For example, samples of 1000 transactions may be stored in the sample queue. After data of a batch of 500 transactions are input to the system 100 and 500 samples are prepared according to the above-described process and stored in the sample queue 14, the oldest or frontmost 500 samples which have been previously stored in the sample queue may be deleted from the sample queue 14. In other embodiments, the length of the sample queue 14 may not be fixed and vary according to various situations. In some embodiments, a batch of samples (e.g., 500 samples) may be randomly selected from the sample queue 14 for training the second DQN 15. During the training, corresponding to each sample, parameters of the second DQN 15 may be adjusted through a stochastic gradient descent algorithm by using s1 and a1 as inputs and Q(s1, a1) as an output label value, such that an output q(s1, a1) of the second DQN 15 corresponding to inputs s1 and a1 is more close to the label value Q(s1, a1) than that of the second DQN 15 before the parameters are adjusted. After the training has been performed by using a number of batches (e.g., 100 batches) of samples (each batch including, e.g., 500 samples), the second DQN 15 may transfer and assign its weights (i.e., parameters) to the first DQN 11. In addition, upon receiving the return r for the first transaction, the evaluation unit 16 may add the return r to a total return value of the system to accumulate the total return value, and thus evaluate the system's learning capacity based on the total return value. The total return value may increase with the number of iterations in the training, and stabilize around a fixed value after second DQN 15 converges.

In some embodiments, when applying the trained model to recognize cash-return transactions, a third transaction's information s3 may be input to the system. The system may predict a cash-return predictive value a3 for the third transaction through the cash-return recognition model DQN 11 and the policy unit 12 based on the transaction information s3 to detect whether the third transaction is a cash-return transaction, and may also output the cash-return predictive value a3.

The above illustrations and descriptions of the system 100 are merely illustrative, and the system 100 according to the embodiments of the specification is not limited to these. For example, the first DQN 11 may be a network trained by the same method as the second DQN 15. For example, the first DQN 11 and the second DQN 15 each has its respective set of parameters. The first DQN 11 and the second DQN 15 may be symmetrical and exchangeable in the system 100. For example, the sample queue 14 may be also connected to the first DQN 11 and provide training samples for the first DQN 11. In such a dual DQN architecture, overestimation by the model can be avoided.

Figure 2:
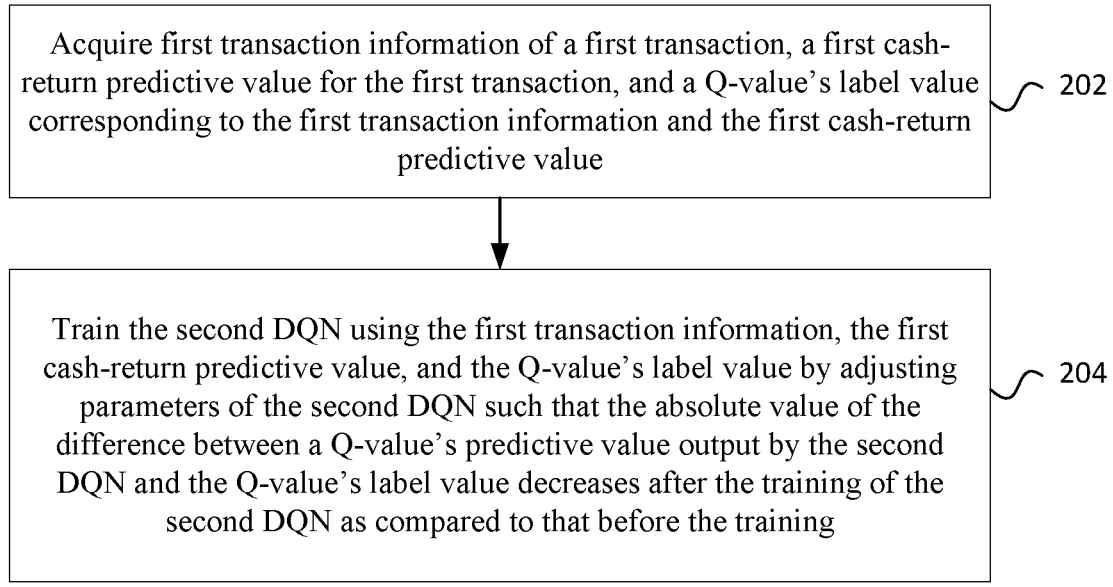
FIG. 2 is a flowchart illustrating a method for training a cash-return recognition model according to some embodiments of the specification.

FIG. 2 is a flowchart illustrating a method for training a cash-return recognition model according to some embodiments of the specification. The cash-return recognition model may include a first DQN 11 and a second DQN 15. The method may include the following steps S202-S204.

At step S202, first transaction information of a first transaction, a first cash-return predictive value for the first transaction, and a Q-value's label value corresponding to the first transaction information and the first cash-return predictive value may be acquired. For example, the first cash-return predictive value may be calculated by inputting the first transaction information to the first DQN 11. The first cash-return predictive value may indicate whether the first transaction is predicted to be a cash-return transaction. The Q-value's label value may be calculated by using a Q learning algorithm based on an output of the first DQN 11 and a first cash-return label value for the first transaction. In some embodiments, the output of the first DQN 11 may include an output resulting from inputting the first transaction information to the first DQN 11 and an output resulting from inputting second transaction information of a second transaction to the first DQN 11. The first cash-return label value may indicate whether the first transaction is labeled as a cash-return transaction.

At step S204, the second DQN 15 may be trained based on the first transaction information, the first cash-return predictive value, and the Q-value's label value by adjusting parameters of the second DQN 15 such that the absolute value of the difference between a Q-value's predictive value output by the second DQN 15 and the Q-value's label value decreases after the training of the second DQN 15 as compared to that before the training. The Q-value's predictive value may be output by inputting the first transaction information and the first cash-return predictive value to the second DQN 15. The Q-value's predictive value thus corresponds to the first transaction information and the first cash-return predictive value.

As described above, at step S202, the first transaction information of the first transaction, the first cash-return predictive value for the first transaction, and the Q-value's label value corresponding to the first transaction information and the first cash-return predictive value are acquired. The cash-return recognition model may be the system as shown in FIG. 1. That is, at step S202, a training sample for training the second DQN 15 in the system shown in FIG. 1 is acquired.

As described with reference to FIG. 1, the first transaction information s1 is input from outside the model. For example, the first transaction information s1 may be input to the model from an environment system, or the first transaction information s1 may be acquired from a data source (e.g., a historical database which stores data of transactions using Ant Credit Pay). The environment system may be a module inputting data to the model. The environment system may acquire data related to the first transaction, e.g., the first transaction information s1, by performing random sampling on a first batch of data. Alternatively, the environment system may acquire the data related to the first transaction by sequential sampling. The first transaction information s1, i.e., a state in a DQN algorithm, may include features associated with each on-line payment transaction using Ant Credit Pay. Examples of the first transaction information s1 may include, but are not limited to, an attribute feature of the transaction (i.e., a feature of the transaction itself), a buyer's feature, a seller's feature, a logistic feature, etc. In some embodiments, the first transaction information s1 may be input to the model in the form of a feature vector, with each dimension of the s1 vector being one or more of the above features, such as the attribute feature of the transaction, the buyer's feature, etc. In other embodiments, the first transaction information s1 may not be input in the form of a feature vector. For example, the first transaction information may be input to the model in the form of a feature table so as to facilitate calculation. For convenience, s1 may also be used to represent the first transaction hereinafter. Similarly, s2 may also be used to represent the second transaction hereinafter.

As shown in FIG. 1, during the training of the model, after the first transaction information s1 is input to the first DQN 11, the first DQN 11 outputs the Q-value vector q(s1) to the policy unit 12. The vector q(s1) may be a two-dimensional vector. For example, the vector q(s1) may include two Q-value's predictive values, one corresponding to a cash-return action, and the other corresponding to a non-cash-return action, where the cash-return action indicates that the first transaction s1 is predicted to be a cash-return transaction, and the non-cash-return action indicates that s1 is predicted to be a non-cash-return transaction. Upon receiving the Q-value vector q(s1), the policy unit 12 selects an action according to a predetermined policy. For example, the predetermined policy may be the ε-greedy policy. An action a is selected according to the ε-greedy policy based on an equation (1) below:

$$a = \begin{cases} \mathrm{argmax}_a Q(s, a) & \sigma > \varepsilon \\ a \sim A(s) & \sigma \leq \varepsilon \end{cases} \quad (1)$$

where ε is a real number between 0 and 1; σ is a randomly selected real number between 0 and 1; and A(s) represents a set containing all available actions. It can be derived from the equation (1) that when ε is relatively small (e.g., ε=0.1), there is a higher probability (e.g., 90%+5%) that the action a takes the greater Q-value's predictive value contained in the vector q(s1), and there is a lower probability (e.g., 5%) that the action a takes a smaller Q-value's predictive value contained in the vector q(s1). For example, the probability π(a|s) of value assignment for a is shown in an equation (2):

$$\pi(a \mid s) = \begin{cases} 1 - \varepsilon + \dfrac{\varepsilon}{|A(s)|} & a = \mathrm{argmax}_a Q(s, a) \\ \dfrac{\varepsilon}{|A(s)|} & \text{Others} \end{cases} \quad (2)$$

As a result, according to the above ε-greedy policy, by randomly determining σ, the cash-return predictive value a1 for the first transaction s1 may be predicted based on the Q-value vector q(s1) output by the first DQN 11. For example, it may be predicted whether s1 is a cash-return transaction.

In the Q learning algorithm, Q(s, a) may be updated according to an equation (3) below:

$$Q(s, a) \leftarrow Q(s, a) + \alpha \left[ r + \gamma \max_a Q(s', a') - Q(s, a) \right] \quad (3)$$

where s' is a state of s at a next moment. In some embodiments, correlation between transactions are not strong, a transaction may therefore be randomly selected as the state of s at the next moment. r is a return value of the action a. As stated above, in some embodiments, when a cash-return predictive value for a transaction is consistent with a cash-return label value, r is determined to be a transaction amount of the transaction s, and when the cash-return predictive value for the transaction is inconsistent with the cash-return label value, r is determined to be the negative of the transaction amount of the transaction s.

$$\max_a Q(s', a')$$

indicates the maximum of the values of the Q-function corresponding to various actions when at the state of s'. In some embodiments, α in the equation (3) takes the value of 1, and thus the equation (3) may be simplified as an equation (4) below:

$$Q(s, a) \leftarrow r + \gamma \max_a Q(s', a') \quad (4)$$

As shown in the equation (4), an updated value of Q(s, a) may be calculated based on the return value r of the action a and the maximum value of the Q-function at the next state of s'. As a result, in training a DQN, the Q-value Q(s, a) calculated by the equation (3) or (4) may be used as a label value for the Q-value's predictive value q(s, a) output by the DQN.

Figure 3:
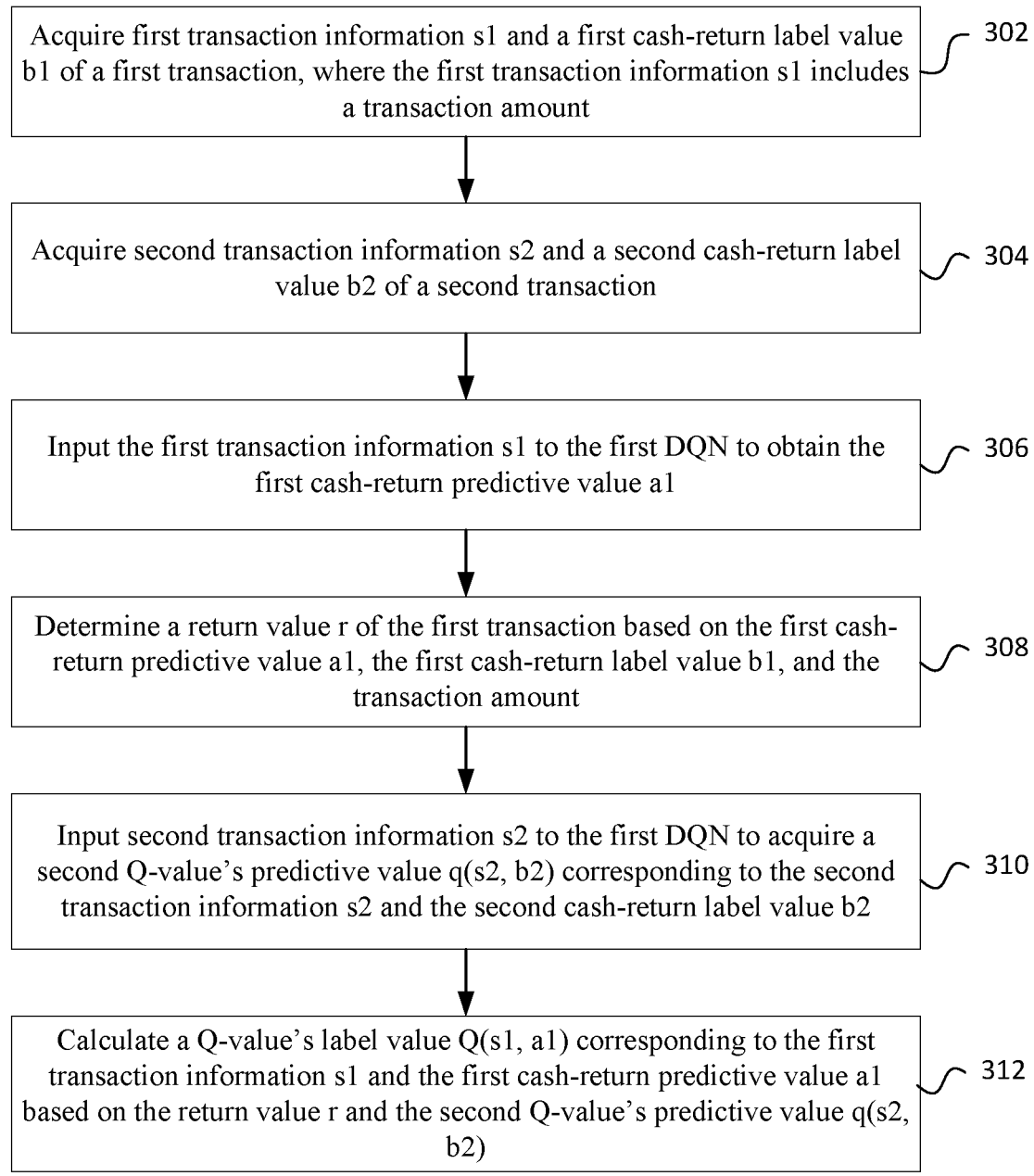
FIG. 3 is a flowchart illustrating a method for implementing a Q learning algorithm according to some embodiments of the specification.

FIG. 3 is a flowchart illustrating a method for implementing a Q learning algorithm according to some embodiments of the specification. For example, the method may include the steps of implementing the equation (4) above, such as the following steps S302-S312. These steps may be implemented by the system 100 as shown in FIG. 1.

At step S302, first transaction information s1 and a first cash-return label value b1 of a first transaction are acquired, where the first transaction information s1 includes a transaction amount, and the first cash-return label value b1 indicates whether the first transaction is labeled as a cash-return transaction. The first transaction information s1 may be acquired as described above. The first cash-return label value b1 may be acquired along with the first transaction information s1. The first cash-return label value b1 and the first transaction information s1 may be historically labelled data of the first transaction in the data of transactions (e.g., transactions based on Ant Credit Pay).

At step S304, second transaction information s2 and a second cash-return label value b2 of a second transaction are acquired, the second cash-return label value b2 indicating whether the second transaction is labelled as a cash-return transaction. The second transaction information is the state of s' at the next moment in the equation (3) or (4) above. In some embodiments, correlation between transactions based on Ant Credit Pay may be weak and the transactions may be correlated to some extent only temporally. For example, data of transactions over a period of time may be similar to some extent. Therefore, data of transactions over a predetermined period of time may be selected as a batch of data to be processed. For example, data of transactions in one day, data of transactions in half a day, etc., may be selected. After the first transaction is selected and the data (s1, b1) related to the first transaction is acquired, the second transaction may be randomly selected in the data of transactions in the predetermined period of time so as to acquire input data (s2, b2) related to the second transaction. Alternatively, the second transaction may be selected according to a temporal order of the transactions in the predetermined period of time so as to acquire the data related to the second transaction.

At step S306, the first transaction information s1 is input to the first DQN 11 to obtain the first cash-return predictive value a1.

At step S308, a return value r of the first transaction is determined based on the first cash-return predictive value a1, the first cash-return label value b1, and the transaction amount. Assuming that the transaction amount of the first transaction is R, if a1=b1, then r=R; and if a1≠b1, then r=−R. For example, a1, b1, and a2 above each may be a one-dimensional value or a two-dimensional vector. When a1, b1, or a2 takes a value of 0, its corresponding transaction, such as the first transaction or the second transaction, is a cash-return transaction, and when a1, b1, or a2 takes a value of 1, its corresponding transaction is a non-cash-return transaction. Alternatively, the value of a1, b1, or a2 may be converted to a two-dimensional vector by a one-hot encoder. For example, when the vector's values are (1, 0), the corresponding transaction is a cash-return transaction, and when the vector's values are (0, 1), the corresponding transaction is a non-cash-return transaction.

As described with reference to FIG. 1, the return value r is determined in the sample preparation unit 13 shown in FIG. 1. The sample preparation unit 13 may receive the cash-return predictive value a1 of the first transaction from the policy unit 12, receive the cash-return label value b2 and the transaction amount (e.g., contained in s1) of the first transaction from outside the system, and thus determine the return value r for the action a1 for the first transaction based on a1, b2, and the transaction amount. After r is determined, the sample preparation unit 13 may calculate the Q-value's label value Q(s1, a1) for the first transaction using r. In addition, the sample preparation unit 13 may send r to the evaluation unit 16 shown in FIG. 1. Upon receiving the return value r of the first transaction, the evaluation unit 16 may add r to a total return value of the system, and thus evaluate the system's learning capacity based on the total return value. The total return value may increase with the number of iterations in training, and stabilize near a fixed value after the model converges.

At step S310, second transaction information s2 is input to the first DQN 11 to acquire a second Q-value's predictive value q(s2, b2) corresponding to the second transaction information s2 and the second cash-return label value b2. After the second transaction information s2 is input to the first DQN 11, the first DQN 11 outputs a Q-value's predictive value vector q(s2) corresponding to s2. The vector q(s2) may be a two-dimensional vector, and include two Q-value's predictive values (q1, q2). The value q1 may correspond to an action that the transaction is a cash-return transaction, and q2 may correspond to an action that the transaction is a non-cash-return transaction. For example, the second cash-return label value b2 may be converted to a one-hot code, e.g., (0, 1), element-wise multiplication may be performed on q(s2) and the one-hot code of b2, i.e., (q1×0, q2×1), to obtain a two-dimensional joint characterization vector, e.g., (0, q2). As a result, the maximum (i.e., non-zero Q-value) of two Q-values included in the characterization vector may be taken as the second Q-value's predictive value q(s2, b2). For example, if the characterization vector is (0, q2), q(s2, b2)=q2.

At step S312, the Q-value's label value Q(s1, a1) corresponding to the first transaction information s1 and the first cash-return predictive value a1 is calculated based on the return value r and the second Q-value's predictive value q(s2, b2). According to the equation (4), Q(s1, a1) is related to the return value r of the action a1, and is also related to the maximum of the Q-value's predictive value for a state of s1 at the next moment (i.e., s2). In some embodiments, element-wise multiplication is performed on the Q-value's predictive value vector q(s2), which is obtained by inputting s2, and a one-hot code of b2, and a maximum is taken therefrom, to obtain q(s2, b2). Then, calculation is performed by using q(s2, b2) as $$\max_{a'} Q(s', a')$$

in the equation (4). Because b2 is an s2's label value, the Q-value corresponding to b2, i.e., q(s2, b2), may be the maximum of the Q-values included in the vector q(s2) according to the Q learning algorithm. Therefore, $$\max_{a'} Q(s', a')$$

may be manually selected as q(s2, b2) to correct the Q-value's label value Q(s1, a1). As a result, the Q-value's label value Q(s1, a1) corresponding to s1 and a1 may be calculated based on r and q(s2, b2) according to the equation (4).

In the system 100 shown in FIG. 1, the Q-value's label value Q(s1, a1) is calculated by the sample preparation unit 13. The sample preparation unit 13 may also prepare a training sample, i.e., (s1, a1, Q(s1, a1)) by gathering the cash-return predictive value a1, the Q-value's label value Q(s1, a1) for the first transaction as calculated above, as well as the first transaction information s1 input from outside the system 100. The training sample may be input to the second DQN 15 shown in FIG. 1 to train the second DQN 15. That is, the second DQN 15 may acquire the training sample from the sample preparation unit 13.

In some embodiments, if various states are not independently and identically distributed during state transition in the training, the training may be unstable. For example, during the sample preparation, a first training sample (s1, a1, Q1) is prepared by selecting a first transaction (s1) and a second transaction (s2) within a predetermined period of time, a second training sample (s2, a2, Q2) is prepared by selecting a third transaction (s3) within the period of time, and similarly transaction data within the predetermined period of time are all prepared as training samples. Since these samples represent the transaction data within the same period of time, there may be a correlation between the training samples. For example, if s1, s2, and s3 are all selected in a temporal order from the transaction data, there may be a higher correlation between the first and the second samples, as well as between the second and the third samples.

In some embodiments, the training samples are provided in a sample queue for training the DQN (such as the first DQN 11 or the second DQN 15). As described with reference to FIG. 1, a fixed number of samples may be stored in sequence in the sample queue 14. For example, 1000 samples corresponding to 1000 transactions respectively may be stored in sequence in the sample queue 14. The sample queue 14 has a characteristic of first in and First out. For example, after a batch of data of 500 transactions are input to the system 100 and 500 samples are prepared according to the above process and stored in sequence in the sample queue 14, the oldest or frontmost 500 samples which were previously stored are deleted from the sample queue 14. The second DQN 15 may randomly select a batch of samples (e.g., 500 samples) from the sample queue 14 for model training. By acquiring samples from a sample queue, sample data in the sample queue may be gradually updated with time, thereby ensuring stability of sampling, preventing fluctuations in the training process caused by a close correlation between adjacent states, and also ensuring timeliness of the samples.

Referring back to FIG. 2, at step S204, the second DQN 15 is trained by using the first transaction information, the first cash-return predictive value, and the Q-value's label value, such that the absolute value of the difference between a Q-value's predictive value output by the second DQN 15 and the Q-value's label value decreases after the training of the second DQN 15 as compared to that before the training 15. The Q-value's predictive value may be output by inputting the first transaction information and the first cash-return predictive value to the second DQN 15, where the Q-value's predictive value corresponds to the first transaction information and the first cash-return predictive value. For example, during the training, parameters (weights) of the second DQN 15 may be adjusted such that the Q-value's predictive value for the second DQN 15 is more close to the Q-value's label value.

In some embodiments, the second DQN 15 may be a convolutional neural network and may be trained using a stochastic gradient descent (SGD) algorithm. In other embodiments, the training of the convolutional neural network may not be limited to the stochastic gradient descent algorithm. For example, the training may be performed using other optimization algorithms, such as a batch gradient descent (BGD) algorithm, a mini-batch gradient descent (MBGD) algorithm, an adaptive moment estimation (Adam) algorithm, and a Root Mean Square Propagation (RMSprop) optimization algorithm.

In some embodiments, the Q-value's label value Q(s1, a1) for the first transaction is obtained through the equation (4)

above. A loss function sampling mean square error (MSE), i.e., a loss function L(s, a, θ) is shown by an equation (5) below:

$$L(s, a, \theta) = (r + \gamma \max_a Q(s', a', \theta') - Q(s, a, \theta))^2 \quad (5)$$

where γ is a factor between 0 and 1; θ' represents parameters of the first DQN 11; and θ represents parameters of the second DQN 15.

According the stochastic gradient descent algorithm, the parameters θ of the second DQN 15 may be adjusted based on an equation (6) below.

$$\theta_{t+1} = \theta_t + \alpha \left[ r + \gamma \max_{a'} Q(s', a'; \theta') - Q(s, a; \theta) \right] \nabla Q(s, a; \theta) \quad (6)$$

where α is a step of parameter adjustment; $\theta_{t+1}$ represents the values of the parameters of the second DQN 15 after the training; and $\theta_t$ represents the values of the parameters of the second DQN 15 before the training. In the equation (6), $$\max_{a'} Q(s', a'; \theta') = Q(s2, b2; \theta'); r + \gamma \max_{a'} Q(s', a'; \theta')$$

is the Q-value's label value Q(s1, a1) calculated above for the first transaction; s in Q (s, a; θ) is s1; a is the cash-return predictive value a1 for the first transaction; and θ takes values of $\theta_t$.

During the training, the first transaction information s1 may be firstly input to the second DQN 15, and the first DQN 11 may output the corresponding Q-value's predictive value vector q(s1) according to the current parameters. The Q-value's predictive value q(s1, a1) corresponding to a1 may then be acquired from the vector q(s1) according to the value of a1. Updated parameters $\theta_{t+1}$ may be calculated by inputting Q(s1, a1), q(s1, a1), s1, a1, and $\theta_t$ into the equation (6).

In some embodiments, by the stochastic gradient descent algorithm, the parameter adjustment may be performed on θ once for each sample, and thus multiple adjustments may be performed on θ for multiple samples, thereby constantly updating θ. As the training samples are updated, the second DQN 15 may be updated in real time according to the features of the samples in different periods of time. The second DQN 15 may transfer the parameters to the first DQN 11 after a predetermined number of times of training (e.g., thousands of times, tens of millions of times). Therefore, the model is trained in real time according to time windows, and adapted to perform prediction on transaction data in a current time window.

Figure 4:
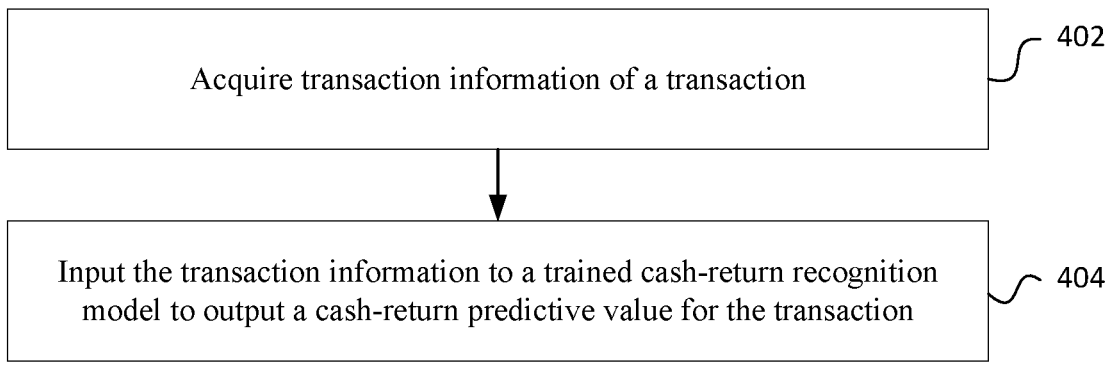
FIG. 4 is a flowchart illustrating a method for cash-return recognition according to some embodiments of the specification.

FIG. 4 is a flowchart illustrating a method for cash-return recognition according to some embodiments of the specification. As shown in FIG. 4, the method may include: step S402, acquiring transaction information of a transaction; and step S404, inputting the transaction information to a trained cash-return recognition model to output a cash-return predictive value for the transaction, the cash-return predictive value indicating whether the transaction is predicted to be a cash-return transaction.

In some embodiments, at step S402, transaction information s3 of a third transaction is acquired, as shown in FIG. 1. The third transaction information s3 may be acquired from an environment system outside the model, or may be acquired from a data source (e.g., a current transaction database which stores data of transactions using Ant Credit Pay). Similar to the first transaction information s1, the third transaction information s3 may include features related to an on-line payment transaction using Ant Credit Pay, e.g., an attribute feature of the transaction (i.e., a feature of the transaction itself), a buyer's feature, a seller's feature, a logistic feature, etc. In some embodiments, the third transaction information s3 is input to the model in the form of a feature vector, with each dimension of the s3 vector being the one or more of the above features, such as the attribute feature of the transaction, the buyer's feature, etc. In other embodiments, the third transaction information s3 may not be input in the form of a feature vector. For example, the third transaction information s3 may be input to the model in the form of a feature table so as to facilitate calculation.

In some embodiments, at step S404, the transaction information may be input to a cash-return recognition model trained by using the above-described methods for training a cash-return recognition model to output a cash-return predictive value for the transaction. The cash-return predictive value indicates whether the transaction is predicted to be a cash-return transaction. After the third transaction information s3 is input to the cash-return recognition model, the third transaction information s3 may be input to the first DQN 11 shown in FIG. 1. The first DQN 11 may output a two-dimensional Q-value's predictive value vector q(s3) corresponding to the third transaction information s3 to the policy unit 12. In the policy unit 12, as stated above, according to the ε-greedy policy, a cash-return predictive value a3 for the transaction may be calculated based on the Q-value's predictive value vector q(s3), and a3 may be output as a prediction result of the model.

Figure 5:
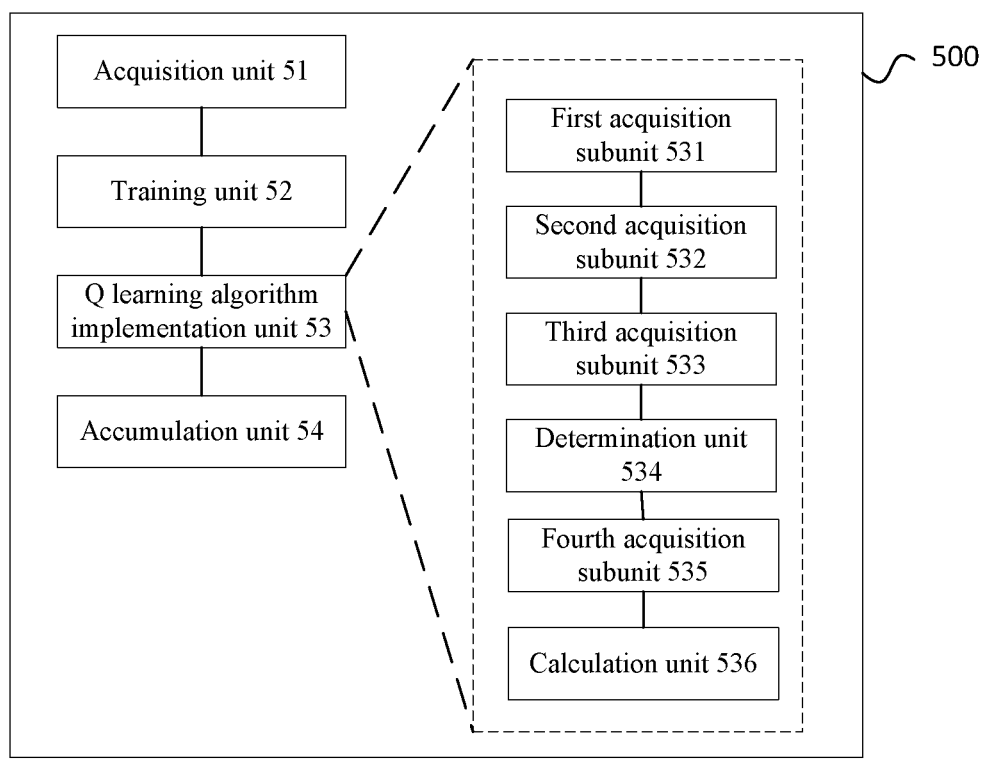
FIG. 5 is a schematic diagram illustrating a device for training a cash-return recognition model according to some embodiments of the specification.

FIG. 5 is a schematic diagram illustrating a device 500 for training a cash-return recognition model according to some embodiments of the specification. As shown in FIG. 5, the device 500 may include an acquisition unit 51 and a training unit 52.

The acquisition unit 51 may be configured to acquire first transaction information of a first transaction, a first cash-return predictive value for the first transaction, and a Q-value's label value corresponding to the first transaction information and the first cash-return predictive value. For example, the first cash-return predictive value may be calculated by inputting the first transaction information to the first DQN 11. The first cash-return predictive value may indicate whether the first transaction is predicted to be a cash-return transaction. The Q-value's label value may be calculated by using a Q learning algorithm based on an output of the first DQN 11 and a first cash-return label value for the first transaction. In some embodiments, the output of the first DQN 11 may include an output resulting from inputting the first transaction information to the first DQN 11 and an output resulting from inputting second transaction information of a second transaction to the first DQN 11. The first cash-return label value may indicate whether the first transaction is labeled as a cash-return transaction.

The training unit 52 may be configured to train the second DQN 15 based on the first transaction information, the first cash-return predictive value, and the Q-value's label value by adjusting parameters of the second DQN 15 such that the absolute value of the difference between a Q-value's predictive value output by the second DQN 15 and the Q-value's label value decreases after the training as compared to that before the training. The Q-value's predictive value may be output by inputting the first transaction information and the first cash-return predictive value to the second DQN 15.

The Q-value's predictive value thus corresponds to the first transaction information and the first cash-return predictive value.

In some embodiments, the device 500 for training a cash-return recognition model may further include a Q learning algorithm implementation unit 53. The Q learning algorithm implementation unit 53 may include a first acquisition subunit 531, a second acquisition subunit 532, a third acquisition subunit 533, a determination unit 534, a fourth acquisition subunit 535 and a calculation unit 536.

The first acquisition subunit 531 may be configured to acquire the first transaction information of the first transaction and the first cash-return label value of the first transaction. For example, the first transaction information includes a transaction amount, and the first cash-return label value indicates whether the first transaction is determined to be a cash-return transaction. The second acquisition subunit 532 may be configured to acquire the second transaction information and a second cash-return label value of the second transaction. The second cash-return label value may indicate whether the second transaction is labeled as a cash-return transaction.

The third acquisition subunit 533 may be configured to input the first transaction information to the first DQN 11 to obtain the first cash-return predictive value. The determination unit 534 may be configured to determine a return value for the first transaction based on the first cash-return predictive value, the first cash-return label value, and the transaction amount. The fourth acquisition subunit 535 may be configured to input the second transaction information to the first DQN 11 to obtain a second Q-value's predictive value corresponding to the second transaction information and the second cash-return label value. The calculation unit 536 may be configured to calculate the Q-value's label value corresponding to the first transaction information and the first cash-return predictive value based on the return value and the second Q-value's predictive value.

In some embodiments, in the device 500 for training a cash-return recognition model, the cash-return recognition model may further include a sample queue. For example, a fixed number of samples may be stored in sequence in the sample queue, and a predetermined number of existing samples ranked in the front may be deleted from the sample queue when the sample queue receives the predetermined number of new samples. In some embodiments, the acquisition unit 51 may be further configured to randomly acquire a first sample from the sample queue, and the first sample includes the first transaction information of the first transaction, the first cash-return predictive value for the first transaction, and the Q-value's label value corresponding to the first transaction information and the first cash-return predictive value.

In some embodiments, in the device 500, the training unit 52 may be further configured to train the second DQN 15 by a stochastic gradient descent algorithm by using the first transaction information, the first cash-return predictive value, and the Q-value's label value.

In some embodiments, in the device 500, the first acquisition subunit 531 may be further configured to input the first transaction information to the first DQN 11 to output a two-dimensional vector of Q-value's predictive values corresponding to the first transaction information, and acquire the first cash-return predictive value according to a ε-greedy policy based on the vector.

In some embodiments, in the device 500, the fourth acquisition subunit 535 may be further configured to input the second transaction information to the first DQN 11 to acquire a two-dimensional vector of Q-value's predictive values corresponding to the second transaction information; perform one-hot encoding on the second cash-return label value to obtain a two-dimensional second vector of cash-return label values; perform an element-wise multiplication on the vector of Q-value's predictive values and the second vector of cash-return label values to obtain a two-dimensional joint characterization vector; and acquire a non-zero Q-value in the joint characterization vector as the second Q-value's predictive value.

In some embodiments, in the device 500, the determination unit 534 may be further configured to determine that the return value for the first transaction is equal to the transaction amount when the first cash-return predictive value is consistent with the first cash-return label value; and that the return value for the first transaction is equal to the negative of the transaction amount when the first cash-return predictive value is inconsistent with the first cash-return label value.

In some embodiments, the device 500 may further include an accumulation unit 54 configured to, after the return value of the first transaction is determined based on the first cash-return predictive value, the first cash-return label value, and the transaction amount, increase a total return value by the return value of the first transaction to accumulate the total return value for the model.

Figure 6:
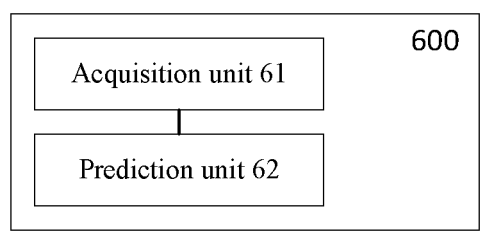
FIG. 6 is a schematic diagram illustrating a device for cash-return recognition according to some embodiments of the specification.

FIG. 6 is a schematic diagram illustrating a device 600 for cash-return recognition according to some embodiments of the specification. As shown in FIG. 6, the device 600 may include: an acquisition unit 61 configured to acquire transaction information of a transaction; and a prediction unit 62 configured to input the transaction information to a cash-return recognition model trained by using the above-described methods to obtain a cash-return predictive value for the transaction. The cash-return predictive value indicates whether the transaction is predicted to be a cash-return transaction.

In some embodiments, in the device 600 for cash-return recognition, the prediction unit 62 may be further configured to input the transaction information to the cash-return recognition model to obtain a two-dimensional vector of Q-value's predictive values corresponding to the transaction information, and calculate the cash-return predictive value for the transaction according to a ε-greedy policy based on the vector of Q-value's predictive value.

In the cash-return recognition solutions according to the embodiments of the specification, a DQN reinforcement learning mechanism is applied for recognition of a cash-return transaction. Features related to a transaction are obtained as states input to a model, transaction labels are obtained as cash-return label values input to the model as well. Transaction amounts may be obtained after the model selects an action, and used as returns for the model. An end-to-end transaction recognition system may therefore be created. DQNs are created for cash-return recognition and model training respectively. Parameters of the model training network (such as the second DQN 15) are updated in real time during model training, and the parameters are transferred to the cash-return recognition DQN (such as the first DQN 11) at an interval of a number of iterations. By using a transaction amount as a return of a reinforcement learning model, and incorporating the amount into a learning process, the model can obtain a higher positive return when correctly recognizing a cash-return transaction which involves a large amount, and result in a negative return in a misjudgment. Therefore, the model is more cautious about processing of transactions which involve large amounts, and thus fits business needs better. A deep neural network is used as an approximation function of a value function, and the neural network is trained based on inputs in small batches. The training of the network may be performed using such a mechanism for all incremental sample data, which helps reduce time and resource overheads of model iteration, and accelerates convergence of the model. Training mechanisms such as experience replay, random sampling, and batch data (i.e., storing training data in a fixed-length memory queue in which a training sample at a new moment may squeeze a sample at a historical moment out of the queue), achieve the effect of sampling based on time windows. In the meanwhile, the random sampling ensures a relative randomness of samples in timewise.

The foregoing describes embodiments of the specification. Other embodiments fall within the scope of the appended claims. The acts or steps in the claims may be performed in a different order than that in the current embodiments and can still achieve the desired results. In addition, the processes depicted in the accompanying drawings do not necessarily require a consecutive order or other orders shown in the drawings to achieve the desired results. In some embodiments, multitasking and parallel processing are also possible or may be advantageous.

One of ordinary skills in the art may further appreciate that the elements of the examples and steps of the algorithms described in connection with the embodiments disclosed herein can be implemented in the form of electronic hardware, computer software, or a combination thereof, and that the components and steps of the examples have been described generally according to their functions in the foregoing description to clearly demonstrate interchangeability of hardware and software. Whether the functions are implemented in hardware or software depends on the particular application and design constraints of the technical solutions. One of ordinary skills in the art may use different methods to implement the described functions for different applications, but such implementations should not be construed as going beyond the scope of this application.

The steps of the methods or algorithms described in connection with the embodiments disclosed herein may be implemented in the form of hardware, a software module executed by a processor, or a combination thereof. The software module may reside in a random access memory (RAM), memory, a read-only memory (ROM), an electrically programmable ROM, an electrically erasable programmable ROM, a register, a hard disk, a removable disk, a compact disc ROM (CD-ROM), or any other form of storage medium known in the art.

The embodiments described above provide a further detailed description of the objectives, technical solutions, and advantageous of the application. It should be understood that the foregoing descriptions are merely embodiments of the application and are not intended to limit the scope of the application, and that any modifications, equivalent replacements, modifications, and the like made without departing from the spirit and principles of the application are intended to be included within the scope of the application.

What is claimed is:

1. A method for training a cash-return recognition model, the cash-return recognition model comprising a first Deep Q-Network (DQN) and a second DQN, the method comprising:
   acquiring first transaction information of a first transaction and a first cash-return label value of the first transaction, the first cash-return label value indicating whether the first transaction is labeled as a cash-return transaction;
   calculating a first cash-return predictive value for the first transaction by inputting the first transaction information to the first DQN, the first cash-return predictive value indicating whether the first transaction is predicted to be a cash-return transaction;
   calculating a Q-value's label value corresponding to the first transaction information and the first cash-return predictive value by using a Q learning algorithm based on the first DQN and the first cash-return label value; and
   training the second DQN based on the first transaction information, the first cash-return predictive value, and the Q-value's label value by adjusting parameters of the second DQN such that an absolute value of a difference between a first Q-value's predictive value output by the second DQN after the training and the Q-value's label value is smaller than that between the first Q-value's predictive value output by the second DQN before the training and the Q-value's label value, wherein the first Q-value's predictive value is output by inputting the first transaction information and the first cash-return predictive value to the second DQN after the training, and the first Q-value's predictive value corresponds to the first transaction information and the first cash-return predictive value.

2. The method for training a cash-return recognition model according to claim 1, wherein calculating the first cash-return predictive value for the first transaction comprises:
   inputting the first transaction information to the first DQN to obtain a two-dimensional vector of Q-value's predictive values; and
   calculating the first cash-return predictive value according to a s-greedy policy based on the vector.

3. The method for training a cash-return recognition model according to claim 1, wherein the first transaction information comprises a transaction amount, and wherein calculating a Q-value's label value corresponding to the first transaction information and the first cash-return predictive value by using a Q learning algorithm comprises:
   acquiring second transaction information of a second transaction and a second cash-return label value of the second transaction, the second cash-return label value indicating whether the second transaction is labeled as a cash-return transaction;
   determining a return value for the first transaction based on the first cash-return predictive value, the first cash-return label value, and the transaction amount;
   inputting the second transaction information to the first DQN to obtain a second Q-value's predictive value corresponding to the second transaction information and the second cash-return label value; and
   calculating the Q-value's label value corresponding to the first transaction information and the first cash-return predictive value based on the return value and the second Q-value's predictive value.

4. The method for training a cash-return recognition model according to claim 3, wherein inputting the second transaction information to the first DQN to obtain the second Q-value's predictive value corresponding to the second transaction information and the second cash-return label value comprises:

inputting the second transaction information to the first DQN to obtain a two-dimensional vector of Q-value's predictive values corresponding to the second transaction information;

performing one-hot encoding on the second cash-return label value to obtain a two-dimensional vector corresponding to the second cash-return label value;

performing an element-wise multiplication on the vector of Q-value's predictive values and the vector corresponding to the second cash-return label value to obtain a two-dimensional joint characterization vector; and selecting a non-zero value in the joint characterization vector as the second Q-value's predictive value.

5. The method for training a cash-return recognition model according to claim 3, wherein determining the return value for the first transaction based on the first cash-return predictive value, the first cash-return label value, and the transaction amount comprises:

in response to that the first cash-return predictive value is consistent with the first cash-return label value, determining the return value for the first transaction to be the transaction amount; and in response to that the first cash-return predictive value is inconsistent with the first cash-return label value, determining the return value for the first transaction to be the negative of the transaction amount.

6. The method for training a cash-return recognition model according to claim 3, further comprising adding the return value for the first transaction to a total return value of the model after determining the return value.

7. The method for training a cash-return recognition model according to claim 1, wherein the cash-return recognition model further comprises a sample queue including a number of samples in sequence, the method further comprises:

updating the sample queue by deleting a predetermined number of existing samples ranked in the front from the sample queue when receiving a predetermined number of new samples.

8. The method for training a cash-return recognition model according to claim 7, wherein the method further comprises:

preparing the samples in the sample queue, each sample including a transaction's information, a cash-return predictive value of the transaction, and a Q-value's label value corresponding to the transaction's information and the cash-return predictive value.

9. The method for training a cash-return recognition model according to claim 1, wherein the first transaction information comprises attribute information, a buyer's information, a seller's information, and logistics information of the first transaction.

10. The method for training a cash-return recognition model according to claim 1, wherein the first DQN or the second DQN comprises one of the following neural networks: an Long Short-Term Memory (LSTM) network, a Deep Neural Network (DNN), a Convolutional Neural Network (CNN), and an Recurrent Neural Network (RNN).

11. The method for training a cash-return recognition model according to claim 1, wherein training the second DQN based on the first transaction information, the first cash-return predictive value, and the Q-value's label value comprises training the second DQN by a stochastic gradient descent algorithm.

12. The method for training a cash-return recognition model according to claim 1, further comprising setting parameters of the first DQN based on the parameters of the second DQN.

13. The method for training a cash-return recognition model according to claim 1, wherein the first DQN and the second DQN are interchangeable.

14. A method for cash-return recognition, comprising:

acquiring first transaction information of a first transaction and a first cash-return label value of the first transaction, the first cash-return label value indicating whether the first transaction is labeled as a cash-return transaction;

calculating a first cash-return predictive value for the first transaction by inputting the first transaction information to a first Deep Q-Network (DQN), the first cash-return predictive value indicating whether the first transaction is predicted to be a cash-return transaction;

calculating a Q-value's label value corresponding to the first transaction information and the first cash-return predictive value by using a Q learning algorithm based on the first DQN and the first cash-return label value; and training a second DQN based on the first transaction information, the first cash-return predictive value, and the Q-value's label value by adjusting parameters of the second DQN such that a difference between a Q-value's predictive value output by the second DQN and the Q-value's label value decreases after the training;

assigning the parameters of the second DQN to the first DQN;

acquiring transaction information of a transaction; and inputting the transaction information to the first DQN to obtain a cash-return predictive value for the transaction, the cash-return predictive value indicating whether the transaction is predicted to be a cash-return transaction.

15. The method for cash-return recognition according to claim 14, wherein inputting the transaction information to the first DQN to obtain the cash-return predictive value for the transaction comprises:

inputting the transaction information to the first DQN to obtain a two-dimensional vector of Q-value's predictive values corresponding to the transaction information; and calculating the cash-return predictive value for the transaction according to a s-greedy policy based on the vector.

16. A device for training a cash-return recognition model, the cash-return recognition model comprising a first Deep Q-Network (DQN) and a second DQN, wherein the device comprises one or more processors and one or more non-transitory computer-readable memories coupled to the one or more processors and configured with instructions executable by the one or more processors to cause the device to perform operations comprising:

acquiring first transaction information of a first transaction and a first cash-return label value of the first transaction, the first cash-return label value indicating whether the first transaction is labeled as a cash-return transaction;

calculating a first cash-return predictive value for the first transaction by inputting the first transaction information to the first DQN, the first cash-return predictive value indicating whether the first transaction is predicted to be a cash-return transaction;

calculating a Q-value's label value corresponding to the first transaction information and the first cash-return predictive value by using a Q learning algorithm based on the first DQN and the first cash-return label value; and training the second DQN based on the first transaction information, the first cash-return predictive value, and the Q-value's label value by adjusting parameters of the second DQN such that an absolute value of a difference between a first Q-value's predictive value output by the second DQN after the training and the Q-value's label value is smaller than that between the first Q-value's predictive value output by the second DQN before the training and the Q-value's label value, wherein the first Q-value's predictive value is output by inputting the first transaction information and the first cash-return predictive value to the second DQN after the training, and the first Q-value's predictive value corresponds to the first transaction information and the first cash-return predictive value.

17. The device for training a cash-return recognition model according to claim 16, wherein calculating the first cash-return predictive value for the first transaction comprises:

inputting the first transaction information to the first DQN to obtain a two-dimensional vector of Q-value's predictive values; and calculating the first cash-return predictive value according to a s-greedy policy based on the vector.

18. The device for training a cash-return recognition model according to claim 16, wherein the first transaction information comprises a transaction amount, and wherein calculating a Q-value's label value corresponding to the first transaction information and the first cash-return predictive value by using a Q learning algorithm comprises:

acquiring second transaction information of a second transaction and a second cash-return label value of the second transaction, the second cash-return label value indicating whether the second transaction is labeled as a cash-return transaction;

determining a return value for the first transaction based on the first cash-return predictive value, the first cash-return label value, and the transaction amount;

inputting the second transaction information to the first DQN to obtain a second Q-value's predictive value corresponding to the second transaction information and the second cash-return label value; and calculating the Q-value's label value corresponding to the first transaction information and the first cash-return predictive value based on the return value and the second Q-value's predictive value.

19. The device for training a cash-return recognition model according to claim 18, wherein inputting the second transaction information to the first DQN to obtain the second Q-value's predictive value corresponding to the second transaction information and the second cash-return label value comprises:

inputting the second transaction information to the first DQN to obtain a two-dimensional vector of Q-value's predictive values corresponding to the second transaction information;

performing one-hot encoding on the second cash-return label value to obtain a two-dimensional vector corresponding to the second cash-return label value;

performing an element-wise multiplication on the vector of Q-value's predictive values and the vector corresponding to the second cash-return label value to obtain a two-dimensional joint characterization vector; and selecting a non-zero value in the joint characterization vector as the second Q-value's predictive value.

20. The device for training a cash-return recognition model according to claim 18, wherein determining the return value for the first transaction based on the first cash-return predictive value, the first cash-return label value, and the transaction amount comprises:

in response to that the first cash-return predictive value is consistent with the first cash-return label value, determining the return value for the first transaction to be the transaction amount; and in response to that the first cash-return predictive value is inconsistent with the first cash-return label value, determining the return value for the first transaction to be the negative of the transaction amount.

* * * * *

UNITED STATES PATENT AND TRADEMARK OFFICE
CERTIFICATE OF CORRECTION

| | | |
|---|---|---|
| PATENT NO. | : 12,033,068 B2 | Page 1 of 1 |
| APPLICATION NO. | : 16/446304 | |
| DATED | : July 9, 2024 | |
| INVENTOR(S) | : Qi Zhao | |

It is certified that error appears in the above-identified patent and that said Letters Patent is hereby corrected as shown below:

In the Claims

Claim 2, Column 18, Lines 38-39:
"calculating the first cash-return predictive value according to a s-greedy policy" should read
-- calculating the first cash-return predictive value according to a ε-greedy policy --.

Claim 14, Column 20, Line 25:
"training a second DON based on the first transaction information" should read -- training a second DQN based on the first transaction information --.

Claim 17, Column 21, Lines 27-28:
"calculating the first cash-return predictive value according to a s-greedy policy" should read
-- calculating the first cash-return predictive value according to a ε-greedy policy --.

Signed and Sealed this
Tenth Day of September, 2024

Katherine Kelly Vidal
*Director of the United States Patent and Trademark Office*